United States Patent

[11] 3,627,158

| [72] | Inventor | Frank Kobasic |
| | | 427 Harwicke Road, Springfield, Pa. 19064 |
| [21] | Appl. No. | 831,369 |
| [22] | Filed | June 9, 1969 |
| [45] | Patented | Dec. 14, 1971 |

[54] LOADER FOR VEHICLE TRUNK COMPARTMENT
7 Claims, 10 Drawing Figs.

| [52] | U.S. Cl. | 214/450 |
| [51] | Int. Cl. | B60r 9/00 |
| [50] | Field of Search | 214/450, 451, 452, 453, 454, 83.24 |

[56] References Cited
UNITED STATES PATENTS

| 2,014,019 | 9/1935 | Girl | 214/450 |
| 2,091,071 | 8/1937 | Girl | 214/451 |
| 2,547,083 | 4/1951 | Lundgren | 214/451 |
| 2,746,627 | 5/1956 | White | 214/450 |
| 2,778,517 | 1/1957 | Weinstein et al. | 214/450 |
| 3,132,755 | 5/1964 | Greenslate | 214/83.24 |

*Primary Examiner*—Albert J. Makay
*Assistant Examiner*—John Mannix
*Attorney*—John F. A. Earley ABSTRACT: A collapsible loader for the trunk compartment of an automotive vehicle comprising a carriage adapted to support a load, a slide member slidingly attached to the carriage, a track member slidingly attached to the slide member, a base member adapted for attachment to a floor of a trunk compartment of an automotive vehicle, and a link pivotally connected at one end to the base member and at its other end to the track member.

Patented Dec. 14, 1971

INVENTOR
FRANK KOBASIC

BY
*John F. A. Earley*
ATTORNEY

Patented Dec. 14, 1971
3,627,158
2 Sheets-Sheet 2
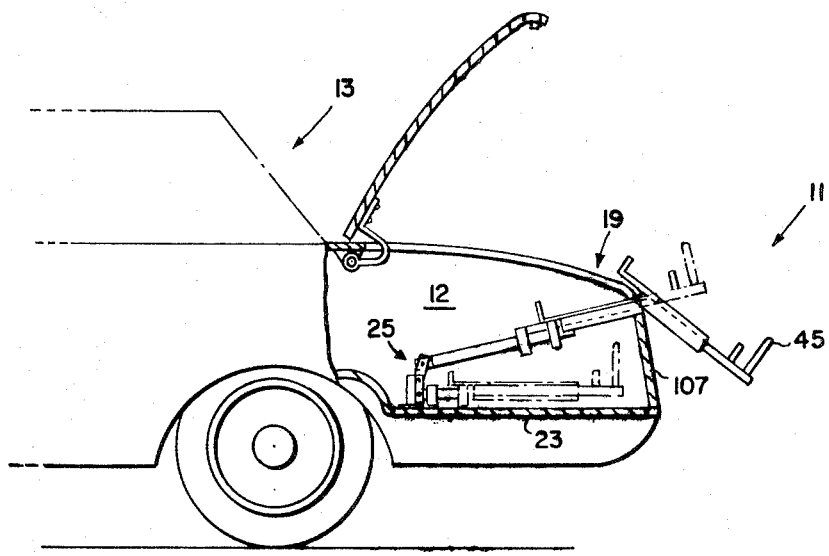
FIG. 5.
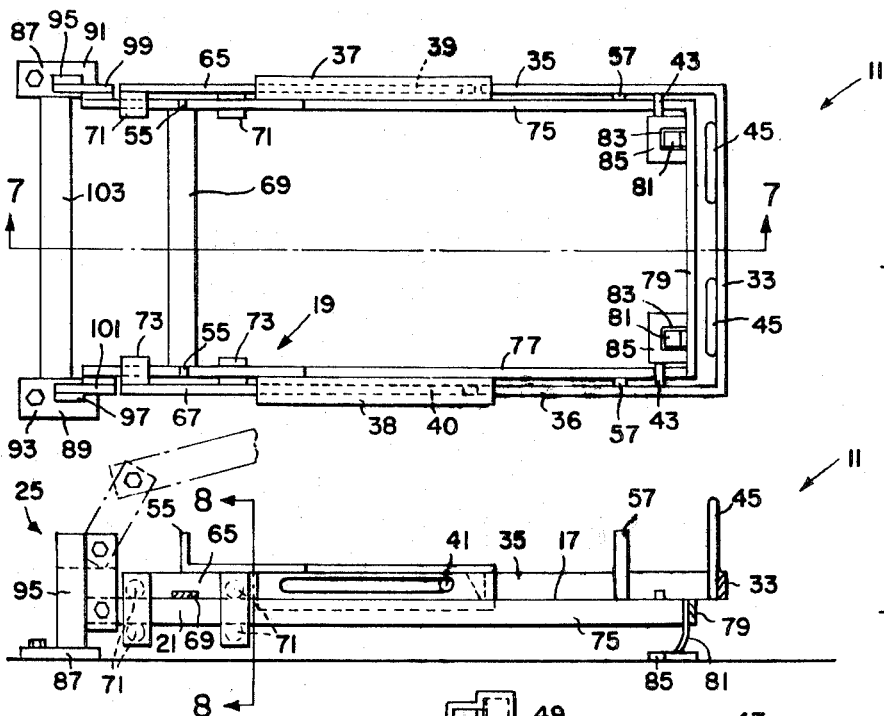
FIG. 6.
FIG. 7.
FIG. 9.
FIG. 8.
FIG. 10.
INVENTOR
FRANK KOBASIC
BY
John F. A. Earley
ATTORNEY

LOADER FOR VEHICLE TRUNK COMPARTMENT

BACKGROUND OF THE INVENTION

The loudspeaker of a Varitone electronic saxophone weighs about 76 pounds and accordingly is so heavy that it is difficult to load into the trunk compartment of an automobile. Other loads present similar difficulties because you have to lift the load, reach into the trunk compartment, and then rather awkwardly lean over to deposit the load onto the floor of the trunk compartment.

Also, unloading the trunk compartment presents similar difficulties in that you must lean into the trunk compartment, reach down, lift up without banging your head against the trunk compartment lid, withdraw the load, and then lean down to deposit it upon the ground.

All of this lifting and reaching places a great strain on the back and other parts of the body.

SUMMARY OF THE INVENTION

Accordingly, it is an object of this invention to provide a loader for the trunk compartment of an automotive vehicle which is easily operated, which collapses into the trunk compartment, and which lowers the load to a position below the top of the rear panel of the trunk compartment.

The objects of the invention are accomplished by providing a series of platform members which slide apart from each other from a collapsed position to an extended position, and a link which is pivoted at one end to one of the platform members and at the other end to a base member bracket fastened to the floor of the trunk compartment.

BRIEF DESCRIPTION OF THE DRAWINGS

Other objects and advantages of this invention, including its simplicity and economy, as well as the ease with which it may be adapted to existing equipment, will further become apparent hereinafter and in the drawings, in which:

FIG. 5 shows the loader of FIG. 4 with the front end of the carriage fully lowered and its link in a vertically upright position, and shows the position of the loader in a vehicle car trunk;

FIG. 6 is a view in top of the loader;

FIG. 7 is a view in elevation and in section taken as indicated by the lines and arrows 7—7 which appear in FIG. 6;

FIG. 8 is a view in section taken as indicated by the lines and arrows 8—8 which appear in FIG. 7;

FIG. 9 is a view in top plan of a load support bed that is adapted to seat on the carriage; and FIG. 10 is a view in side elevation taken as indicated by the lines and arrows 10—10 which appear in FIG. 9.

DESCRIPTION OF THE PREFERRED EMBODIMENT

Figure 1:
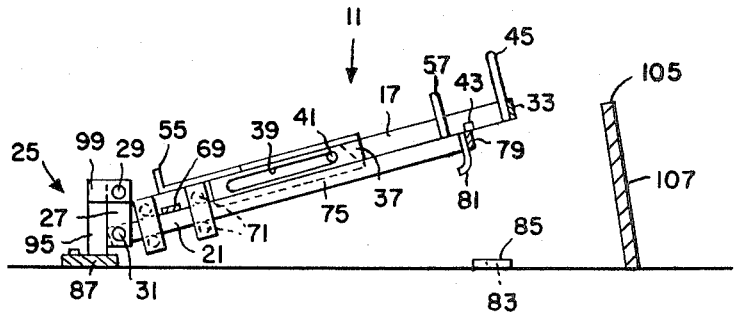
FIG. 1 is a view in central longitudinal section of a loader constructed in accordance with this invention.

Turning now to the specific embodiment of the invention selected for illustration in the drawings, there is shown a collapsible loader 11 for a trunk compartment 12 of an automotive vehicle 13 comprising a carriage 17 adapted to support a load such as a Varitone electronic saxophone speaker, a slide member 19 slidingly attached to carriage 17, a track member 21 slidingly attached to slide member 19, and means for attaching the track member 21 to a floor 23 of trunk compartment 12, said means including a base member 25 adapted for attachment to said floor 23, and a link 27 pivotally connected at one end by pin 29 to base member 25 and pivotally connected at its other end by pin 31 to track member 21.

Carriage 17 includes a carriage crossbar 33 with a pair of carriage arms 35, 36 extending forwardly therefrom, carriage slot housings 37, 38 mounted on the carriage arms 35, 36 and having slots 39, 40 formed therein and adapted to receive rollers 41 extending from slide member 19, carriage tabs 43 extending inwardly from carriage arms 35, 36 and adapted to rest on the track member 21 when the loader is in its collapsed position in order to keep the carriage 17 level, and a pair of handles 45 extending upwardly from carriage crossbar 33.

A load support bed 47 is provided having a pair of support bed crossarms 49, 51 connected together by a longitudinal connecting bar 53. Carriage arms 35, 36 have front stop lugs 55 and rear stop lugs 57 mounted thereon, and the support bed crossarms 49, 51 have stop lug recesses 59, 61 formed therein which are adapted to receive lugs 55, 57 to hold the load support bed 47 in place on carriage 17. Support bed crossarms 49, 51 may be covered with carpeting 63 to cushion the load and protect it from abrasive damage.

Slide member 19 includes a pair of slide member arms 65, 67 connected together by a slide member crossbar 69. Rollers 41 are mounted on slide member 19 and are adapted to ride in slots 39 and 40 formed in slot housings 37, 38 of carriage arms 35, 36. A pair of double rollers 71, 73 are mounted on slide member arms 65, 67 and are adapted to ride on runners 75, 77 of track member 21.

Track member 21 includes track runners 75, 77 connected together by a track crossbar 79. A pair of feet 81 extend downwardly from track crossbar 79 and are adapted to rest in a recess 83 in track member support pads 85 mounted on floor 23 of trunk compartment 12.

Base member 25 includes a pair of base member brackets 87, 89 having a baseplate 91, 93, an upright element 95, 97, and a horizontal element 99, 101. A base crossbar 103 connects brackets 87, 89 together.

In operation, the 76 pound Varitone electronic saxophone speaker will be used for illustrative purposes. Upon opening the lid of trunk compartment 12, loader 11 is in collapsed position as illustrated in FIG. 7 but with load support bed 47 seated on carriage 17. For clarity, load support bed 47 and the speaker have been omitted from the figures showing the loader so that the position of the loader members may be seen. The first step toward bringing the loader 11 into the loading position shown in FIG. 5 is shown in FIG. 1 wherein the rear end of the loader is lifted by grasping handles 45 and raising them upwardly to a position above top 105 of rear panel 107 of trunk compartment 12.

Figure 2:
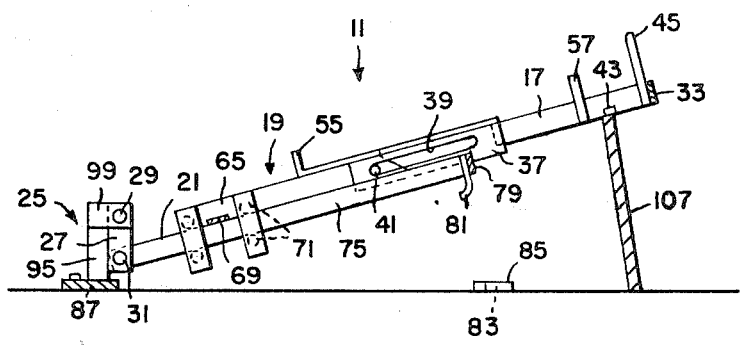
FIG. 2 shows the loader of FIG. 1 partly extended with its carriage resting upon the top of the rear panel of the trunk compartment.
Figure 3:
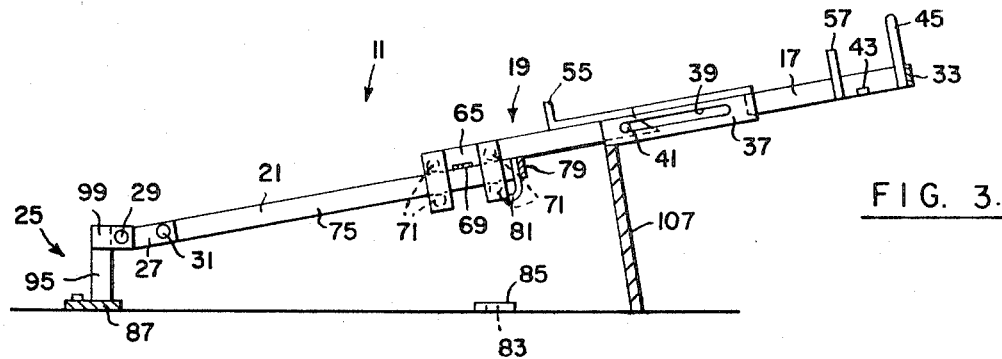
FIG. 3 shows the loader of FIG. 1 fully extended with its slide member resting upon the top of the rear panel of the trunk compartment and with its link assuming a position which is above the horizontal.
Figure 4:
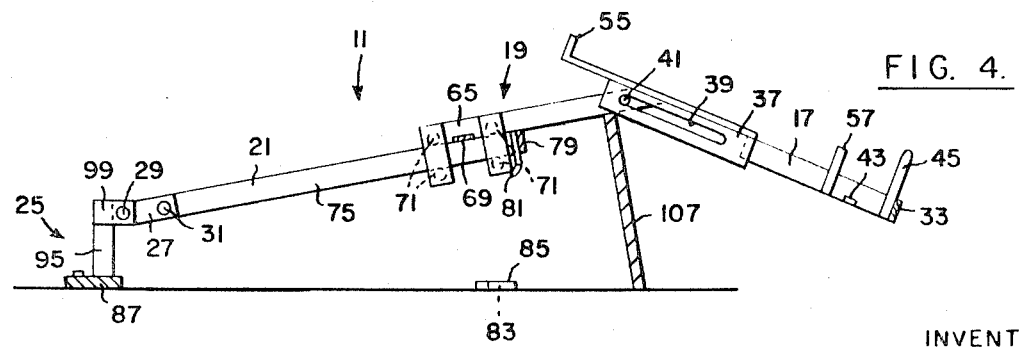
FIG. 4 shows the loader of FIG. 3 with the rear end of its carriage being lowered.

Then the handles 45 are pulled rearwardly to the position shown in FIG. 2, with pivoted link 27 remaining in its vertical downward position. As the puller continued as shown in FIG. 3, the carriage 17, slide member 19, and track member 21 are fully extended and link 27 is rotated about its pivot pin 29 to a position above the horizontal so that members 17, 19, 21, and link 27 are in the same or substantially parallel planes. Then handles 45 are lowered through the position shown in FIG. 4 to the position shown in FIG. 5 with link 27 in its vertical upward position and carriage 17 in its lowermost position. The pivoting of link 27 to its vertical upright position raises the forward end of track member 21 and permits the rear end of carriage 17 to be lowered closer to the ground so that the load does not have to be lifted quite so far.

The load is then placed on carriage 17 and the steps are reversed, with the loader going from the position shown in full lines in FIG. 5 to the positions in FIGS. 4, 3, 2, and 1, successively.

I claim:

1. A collapsible loader for the trunk compartment of an automotive vehicle comprising a carriage adapted to support a load, a slide member slidingly attached to the carriage, a track member slidingly attached to the slide member, and pivotal means for attaching the track member to a floor of an automotive vehicle, said pivotal attaching means including means permitting vertical movement of the pivot means relative to the floor of the trunk compartment during operation of the loader, whereby the front end of the track member is raised so as to lower the carriage closer to the ground as when extended over the rear panel of an automotive trunk compartment so the load does not have to be lifted quite so high to place it on the carriage.

2. The loader of claim 1 wherein the carriage includes a carriage crossbar with a pair of carriage arms extending forwardly therefrom, a carriage slot housing mounted on the carriage arms and having slots adapted to receive rollers extending from the slide member, carriage tabs extending inwardly from the carriage arms and adapted to rest on the track member when the loader is in its collapsed position in order to keep the carriage level, and a pair of handles extending upwardly from the carriage crossbar.

3. The loader of claim 1 wherein said slide member includes a pair of slide member arms connected together by a slide member bar, a pair of rollers mounted on the slide member crossarms and adapted to ride in slots formed in a slot housings of carriage arms of said carriage, and a pair of double rollers adapted to ride on runners of the track member.

4. A collapsible loader for the trunk compartment of an automotive vehicle comprising a carriage adapted to support a load, a slide member slidingly attached to the carriage, a track member slidingly attached to the slide member, and means for attaching the track member to a floor of a trunk compartment of an automotive vehicle, wherein said track member includes a pair of track runners connected together by a track crossbar, and a pair of feet extending downwardly from said track crossbar and adapted to rest in a recess in a track member support pad mounted on the floor of the trunk compartment.

5. A collapsible loader for the trunk compartment of an automotive vehicle comprising a carriage adapted to support a load, a slide member slidingly attached to the carriage, a track member slidingly attached to the slide member, and means for attaching the track member to a floor of a trunk compartment of an automotive vehicle, wherein said base member includes a pair of base member brackets with a baseplate, upright element and horizontal element, and a base crossbar connecting said brackets together.

6. A collapsible loader for the trunk compartment of an automotive vehicle comprising a carriage adapted to support a load, a slide member slidingly attached to the carriage, a track member slidingly attached to the slide member, means for attaching the track member to a floor of a trunk compartment of an automotive vehicle, said means including a base member adapted for attachment to said floor, and a link pivotally connected at one end to the base member and at its other end to the track member, whereby the carriage when extended over a rear panel of a trunk compartment may be lowered closer to the ground by raising the end of the track member connected to the link.

7. A collapsible loader for the trunk compartment of an automotive vehicle comprising a carriage adapted to support a load, a slide member slidingly attached to the carriage, a track member slidingly attached to the slide member, means for attaching the track member to a floor of a trunk compartment of an automotive vehicle, and a load support bed having a pair of support bed crossbars connected together by a longitudinal connecting bar, said carriage arms having bed crossbars having stop lug recesses adapted to receive said lugs to hold the load support bed in place on said carriage.

* * * * *